United States Patent [19]

Gaetano

[11] 4,270,773
[45] Jun. 2, 1981

[54] PERMANENTLY FOLDED MAP IN BOOK FORM

[75] Inventor: Ralph R. Gaetano, Bethel Park, Pa.

[73] Assignee: Think, Inc., Morgantown, W. Va.

[21] Appl. No.: 967,517

[22] Filed: Dec. 7, 1978

[51] Int. Cl.³ .............................................. G09B 29/04
[52] U.S. Cl. ....................................... 283/34; 283/61; 283/62; 434/150
[58] Field of Search ................. 40/40, 42; 283/34, 35, 283/61, 62; 281/5

[56] References Cited

U.S. PATENT DOCUMENTS

| | | | |
|---|---|---|---|
| 1,039,322 | 9/1912 | Rindall | 35/40 X |
| 1,531,065 | 3/1925 | Boyer | 35/40 X |
| 2,789,372 | 4/1957 | Ribak | 35/40 |

FOREIGN PATENT DOCUMENTS

| | | | |
|---|---|---|---|
| 1065194 | 9/1959 | Fed. Rep. of Germany | 35/40 |
| 212445 | 3/1924 | United Kingdom | 283/34 |
| 619023 | 3/1949 | United Kingdom | 35/42 |
| 687073 | 2/1953 | United Kingdom | 35/42 |
| 1179103 | 1/1970 | United Kingdom | 35/40 |

*Primary Examiner*—Paul A. Bell
*Attorney, Agent, or Firm*—Depaoli & O'Brien

[57] ABSTRACT

The map of this invention is permanently folded and attached to the cover which is folded along a front hinge and a rear hinge. A cover flap is attached to the rear hinge. The map is folded laterally so that it comprises a bottom strip and a lateral strip which are attached to the cover, a lateral pleat therebetween which can be flipped upwardly or downwardly, and a top lateral flap which can be flipped downwardly upon the lateral pleat or upwardly.

The map is further folded longitudinally and alternately along seven longitudinal fold lines to provide three longitudinal leaves between the outer sections which are attached to the cover. The central leaf is adhesively secured together along the bottom strip and the lateral strip. The three leaves are slit along their outwardly folded fold lines, except along the bottom strip and the lateral strip thereof. The central leaf can be pulled outwardly to create a centerfold that is pivotable to the right or to the left.

By flipping the lateral flap upwardly when the centerfold is not pulled out, one eighth of the map is visible. By then flipping the lateral pleat upwardly, another eighth is visible. When the centerfold is pulled out and pivoted to one side and the top lateral flap is flipped upwardly, one fourth of the map is visible. When the lateral pleat is flipped upwardly, another fourth is visible. When the centerfold is pivoted to the other side, two other fourths of the entire map are visible, simply by flipping the lateral pleat upwardly or downwardly. A directory is imprinted on the reverse side of the top lateral flap and includes an alphabetical list of cities, villages, and/or other features, a page column, a section column, and a color column for locating a feature by a few quick glances and movements of the fingers.

33 Claims, 13 Drawing Figures

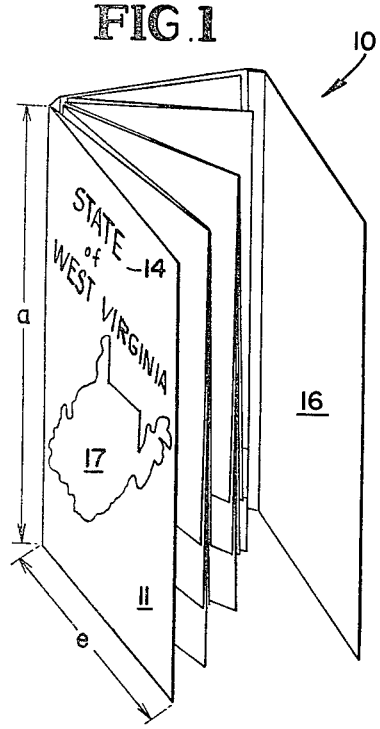
FIG. 1
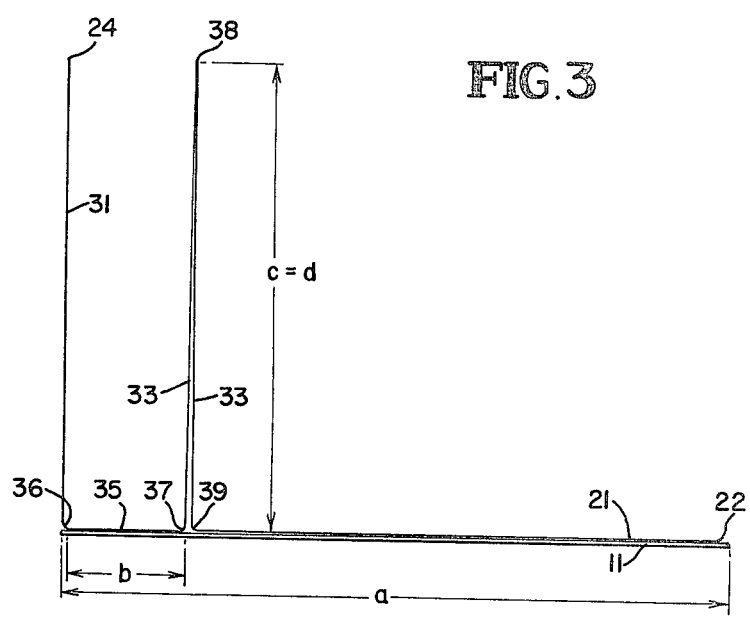
FIG. 3
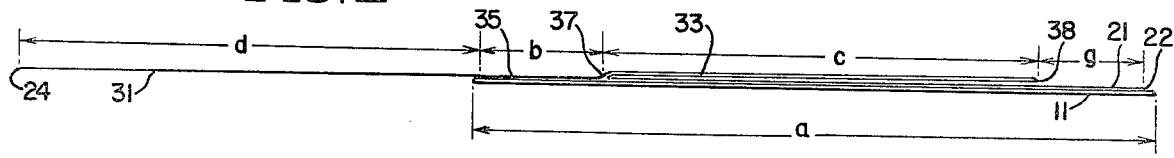
FIG. 4
FIG. 2
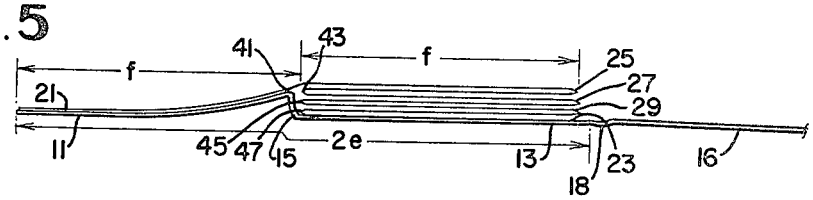
FIG. 5
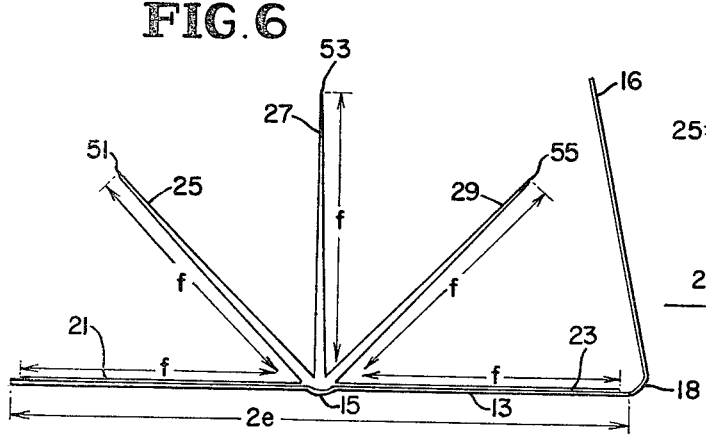
FIG. 6
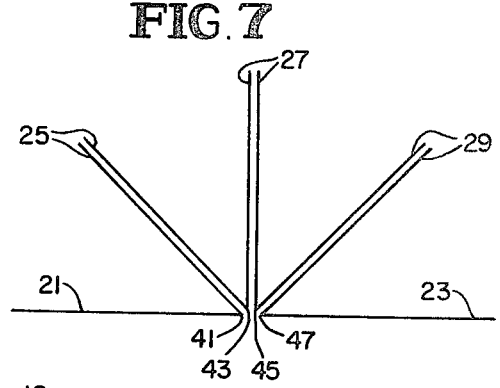
FIG. 7

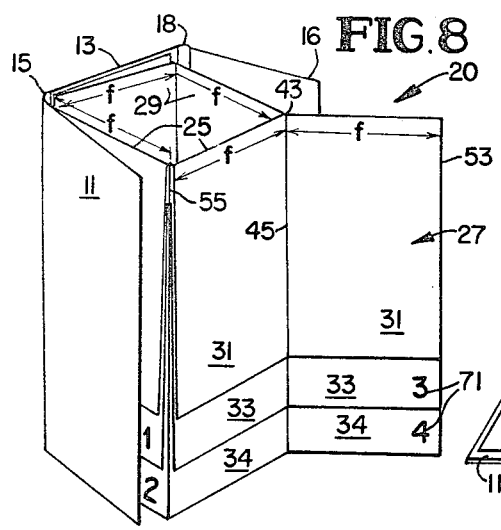
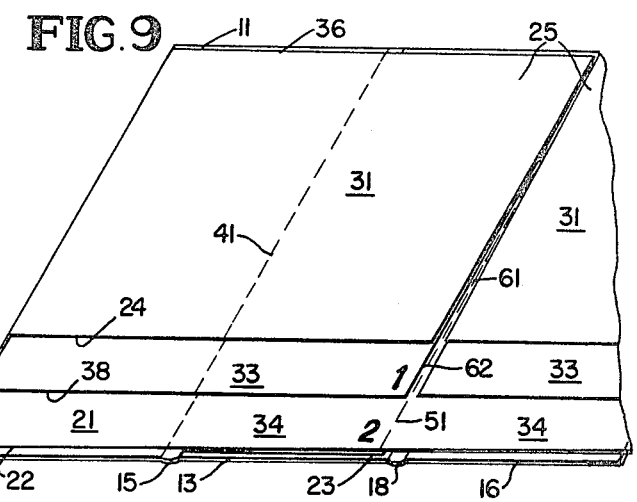
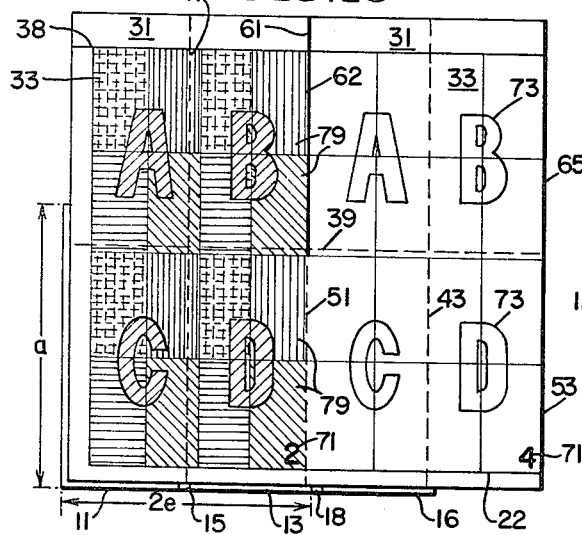
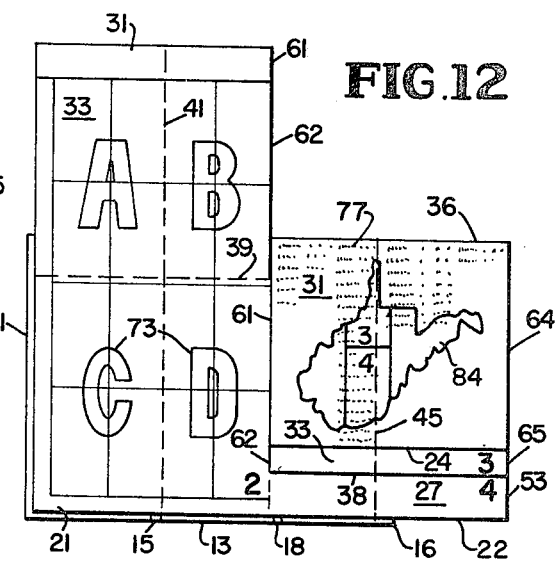
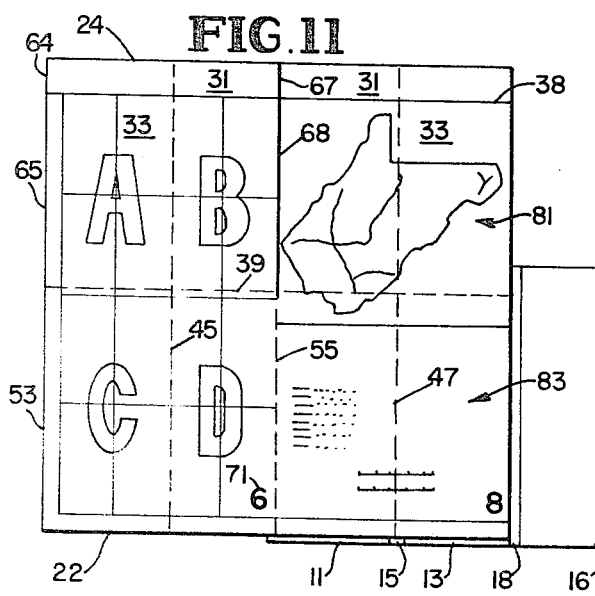
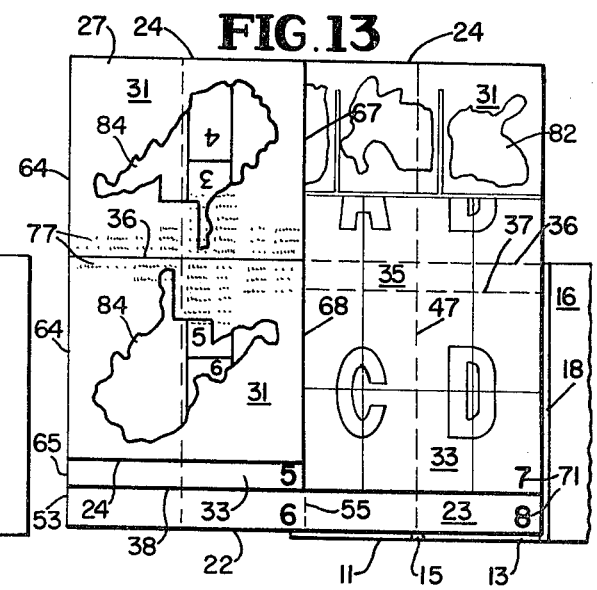

PERMANENTLY FOLDED MAP IN BOOK FORM

BACKGROUND OF THE INVENTION

1. Field of the Invention

This invention relates to a method of folding a map into book form and of mounting the map on the book cover for shelving as a book, for transporting on the user's person, for enabling the user to read the map as a book by sequentially flipping its flaps, and for rapidly locating communities and other pertinent features of almost any size of the map.

2. Review of the Prior Art

Many attempts have been made in the past to fold a map, so that it is reduced into a convenient size for transporting and storing, and for unfolding it, so that it is readily available to a user in a convenient manner. For example, U.S. Pat. No. 2,190,438 describes a method of mounting a map or chart by cutting it into a number of longitudinal strips which are sub-divided into various sections for transverse folding to secure the desired longitudinal reduction in size, the strips thus prepared being mounted upon rocking supports attached to leaves constituting a book so that a single map strip may be displaced laterally to either side of the middle of the book or may be arranged for further displacement laterally, as by hinging the end strips to the respective covers.

U.S. Pat. No. 2,572,460 shows a method of folding maps to book-like form by providing the map with folds in concertina fashion and with transverse pleats which can be turned over and/or disposed at intervals from each other.

U.S. Pat. No. 2,615,732 teaches folding a map into book-like form by folding a middle strip in accordion fashion to form a series of longitudinal panels, the upper and lower edges of which are provided with accordion cross-flaps running perpendicular to these longitudinal panels and the cross-flaps being provided with slits along alternate longitudinal fold-breaks which lie on the front edge of the book, these slits extending to the upper or the lower book edge.

U.S. Pat. No. 1,531,065 discloses a book fold may having both horizontal and vertical fold lines which divide the map into a plurality of quadrants which are numbered for easy reference, the back of the map being attached to a folder.

U.S. Pat. No. 2,333,569 discloses a system for folding a map along horizontal, vertical, and diagonal lines so that the map is reduced to rectangular sections and can be successfully folded about the diagonals for easy refernce.

U.S. Pat. No. 3,143,363 shows a method for folding a map into the shape of a book by using both vertical and horizontal fold lines, both internal and external, with an inner flap being folded downwardly only by tearing along perforations.

U.S. Pat. No. 3,248,806 shows a map system in which a map is folded into quadrants along a horizontal and a vertical line for systematic viewing in book form.

However, none of these prior art attempts at conveniently folding a map for storing, transporting, and reading thereof have adequately satisfied the need of the driver of an automobile who is traveling on a modern highway at speeds of about a mile a minute. Furthermore, none of these maps have combined such a convenient folding method with a method for locating small communities and features on the map in a very rapid manner and with little more than a glance and a flip of one or two flaps of the map. Moreover, none are suitable for pilots of small airplanes who navigate by piloting, for they often have difficulty in handling charts bearing radio directional information, topographical features, and airport information while simultaneously flying the airplane, particularly during bad weather. Furthermore, none are designed for use as marine charts to be used by operators of fast fishing boats of the outboard type who frequently have difficulty with displaying and reading charts, particularly during high wind situations, while traveling in waters having underwater obstacles or other dangerous terrain features. In such situations, it is desirable that the map be permanently folded.

Accordingly, there is a need for a map in permanently mounted book form which can be readily manipulated by flipping portions thereof and which can be simultaneously utilized for locating even very minor features with a few rapid glances.

SUMMARY OF THE INVENTION

It is therefor an obejct of this invention to provide a permanently folded map in book form which is readily storable and easily transportable on the person of a user.

It is also an object to provide a map in book form which is easily opened to a selected portion of the map and manipulated with one hand while the user is sterring a wheeled vehicle, snowmobile, airplane, boat or other moving conveyance.

It is further an object to provide a map in book form which opens out into a portion having at least twice the area that is available by flipping pleats and flaps thereof.

It is additionally an obejct to provide a directory and a coding system that provides the location of and access to even small communities or other pertinent features of the map.

In accordance with these objectives and the principles of this invention, a permanently mounted map in book form is provided which comprises:

A. a cover, having a longitudinal hinge between a front cover and a back cover to which portions of the map are attached, and a top edge; and B. a map (as a general word representing a map, chart, engineering drawing, and the like) which is first folded laterally and then longitudinally to provide:

(1) at least four lateral folds, forming: a bottom strip, at least one lateral strip, at least one lateral pleat disposed between the strips, and a lateral flap, each lateral pleat having one lateral strip along the upper edge thereof and the number of the lateral strips and the lateral pleats being equal, and (2) at least seven longitudinal folds forming at least three double leaves and a pair of single leaves in flanking relationship to the double leaves, the lateral flap and the lateral pleat being slit along the outward folds thereof, the lateral strip and the bottom strip within the single leaves forming the portions to which the front cover and the back cover are attached, and the lateral flap being disposed along the top edge of the lateral strip and approximately along the top edge of the cover.

The at least three double leaves are always an odd number of double leaves, or are always a multiple of groups of such odd numbers, wherein the inward longitudinal fold between each odd-numbered group of double leaves is held in close proximity to the hinge by a suitable restraining means. Both sides of the central double leaf of each odd number of double leaves are attached to each other to form a central conjoined leaf, whereby an outward pull on the central leaf creates an extended centerfold which can be pivoted to either side to overlay either the front or back cover. By upwardly flipping the lateral flap, an upper one fourth of the map, for example, is then exposed to view. By upwardly flipping both the lateral flap and the lateral pleat, a lower one fourth of the map, as another example, is viewable.

The preferred odd number of double leaves is three so that one page is viewable, by upwardly flipping the lateral flap, if the centerfold is not extended and two pages are seen if it is extended, out of the total number of eight pages. By upwardly flipping the lateral pleat, the lower portion of the map is viewable in the same proportions.

When the multiple is one and the odd number of double leaves is five, for example, there are twelve available pages. Extending the centerfold exposes three pages. When the multiple is two and the odd number is three, there are fourteen available pages. Extending either of the two centerfolds enables two pages to be viewed adjacent to the corners of the map, as described hereinbefore for the single centerfold embodiment, but enables three pages to be seen at one time in the middle thereof.

A commercially practicable method of layout, scoring, diecutting, and folding a map and then of permanently mounting the map onto a cover, so that the centerfold or centerfolds are extendible, is also provided. In addition, a directory and a coding system are provided so that the user of the map can readily locate small communities while manipulating the map with on hand if necessary.

BRIEF DESCRIPTION OF THE DRAWINGS

FIG. 1 is a perspective view of a folded map of this invention in book form, the state of West Virginia being illustrated as an example.

FIG. 2 is a left side view of the front cover after flipping the lateral flap upwardly into resting position on a planar surface, such as a table.

FIG. 3 is the same view as FIG. 2 with both the lateral flap and the lateral pleat in vertical position.

FIG. 4 shows the opened front cover of FIG. 2 and 3 with the lateral flap and lateral pleat in closed position.

FIG. 5 is a bottom end view of the book of FIG. 1 which is opened as in FIG. 4, showing only the bottom strip.

FIG. 6 is a bottom end view of the opened book which shows all three of the longitudinal leaves of the bottom strip in equidistant relationship.

FIG. 7 is an enlarged view of a portion of FIG. 6 which shows the confluence of the three pleats in the bottom strip and the inward folds therefor.

FIG. 8 is a top perspective view, corresponding to FIGS. 1 and 6, which shows the centerfold pulled partially outwardly.

FIG. 9 is a perspective plan view which shows the centerfold pulled completely outwardly and pivoted towards the right of the viewer.

FIG. 10 is a plan view that corresponds to FIG. 9, except that both the lateral flap and the lateral pleat have been flipped upwardly.

FIG. 11 is a plan view corresponding to FIG. 10, except that the centerfold has been flipped towards the left of the viewer, the axis of flipping for the centerfold being the hinge of the book, as indicated in FIGS. 8 and 9.

FIG. 12 is a plan view that is similar to FIG. 10, except that both the lateral pleat and the lateral flap on the right side of the centerfold have been flipped downwardly to expose locating information for zones 3 and 4.

FIG. 13 is a plan view of the map in book form, in which the centerfold is extended to the left as in FIG. 11, except that both the lateral pleat and the lateral flap have been flipped downwardly, exposing the locational directions for zones 5 and 6 as well as, in upside down relationship, the locational directions for zones 3 and 4 on the underlying lateral flap.

DETAILED DESCRIPTION OF THE PREFERRED EMBODIMENTS

Referring to the drawings in which corresponding references numerals and letters are used to designate corresponding parts throughout the several views, it can be seen that the map in book form of this invention comprises a foldable cover 10 and a folded map 20 having parts which are adhesively secured to the inside surfaces of cover 10. Cover 10 comprises a front cover 11 and a back cover 13 which are connected by a front hinge 15 and additionally comprises a cover flap 16 which is connected to back cover 13 by a rear hinge 18.

On the front of front cover 11, identifying information 14 as to the nature of the map and a symbol or outline thereof 17 are preferably illustrated. In FIG. 1, the boundary of the State of West Virginia is illustrated as an example for symbol 17.

Map 20 is divided into sections by a folding process which is described with the map being laid out on a planar surface in reading position so that the bottom is towards the viewer and the top is farthest from the viewer. Map 20 is folded inwardly along a first lateral fold line 39 which is spaced from the bottom 22 of the map by a distance that is less by distance b than the length a of cover 10 to define a bottom strip 34. The folded-over portion is then folded outwardly along a second lateral fold line 38 and folded inwardly again along a third lateral fold line 37 to form a lateral pleat 33 having a length that is less by distance g than the distance to bottom 22 of map 20. The upper portion of the map is then folded inwardly along a fourth lateral fold line 36 which is separated from fold line 37 by lateral strip 35 having width b, so that when fold lines 37 and 39 are adjacent, as shown in FIGURES 2-4, fold line 36 is quite close to the top of cover 10. Lateral flap 31 is thereby created which can be flipped upwardly as in FIG. 2 or can be flipped downwardly as in FIG. 4 on top of pleat 33. Lateral flap 31 has longitudinal length d, and lateral pleat 33 has longitudinal length c. As indicated in FIG. 4, c preferably equal d. When flap 31 and pleat 33 are folded downwardly, as shown in FIG. 2, an offset strip having width g between the bottom edge (fold 38) of pleat 33 and bottom edge 22 of map 20 is exposed, and another offset strip h between edge 24 of lateral flap 31 and the bottom edge 38 of lateral pleat 33 is similarly exposed to view.

The map is next scored to be folded along seven parallel, longitudinally disposed fold lines. These fold lines alternate between inward and outward folds, beginning with an inward fold from either side, as indicated in FIGS. 6 and 7. In other words, starting from the left side, the map is first scored to be folded inwardly along fold line 41, outwardly along fold line 51, and inwardly along fold line 43 to define longitudinal leaf 25, then scored to be folded outwardly along fold line 53, inwardly along fold line 45 to define longitudinal leaf 27, and finally scored to be folded outwardly along fold line 55 and inwardly along fold line 47 to define longitudinal leaf 29.

A slit 61 is then cut along fold line 51 through lateral flap 31, and a slit 62 is cut through both sides of lateral pleat 33 along the same fold line 51. Similarly, a slit 64 is cut through lateral flap 31 along fold line 53, and a slit 65 is cut through both sides of lateral pleat 33 along the same fold line 53. In the same manner, a cut 67 is made in lateral flap 31 along fold line 55, and a slit 68 is made through both sides of lateral flap 33 along the seam fold line 55. None of these cuts 61, 62, 64, 65, 67, 68 intersect lateral strip 35, but all end at its edges (i.e., fold lines 37 or 39). Furthermore, none intersect bottom strip 34, all ending at its top edge 39. Lower left section 21 and lower right section 23 form the opposite ends of bottome strip 34.

The two sides of longitudinal leaf 27 are adhesively secured together so that the relationship of longitudinal leaves 25, 27, 29 is as shown in FIG. 8 when the centerfold, which is formed by these three flaps 25, 27, 29, is extended from fold lines 41, 47. The map is then compressed by pushing the centerfold inwardly, while grasping longitudinal leaves 25, 27, 29, from the position shown in FIG. 8 to the position shown in FIG. 6.

The map is then ready to be pasted onto cover 10 by adhesively securing lower left section 21 of map 20 to the inside of front cover 11 and lower right section 23 to the inside of back cover 13 and by further adhesively securing the respective left and right side portions of lateral strip 35 to front cover 11 and back cover 13, so that section 21 and strip 35 extend essentially from the bottom to the top of front cover 11, and section 23 and strip 35 extend essentially from the bottom to the top of back cover 13.

Lateral pleat 33, having been cut into four equal portions and lateral flap 31 having also been cut into four equal portions, the map is then further compressed. Starting, for example, with the map in the position shown in FIG. 5 with all pleats 33 and flaps 31 in upward position and all three longitudinal leaves 25, 27, 29 pivoted onto panel 23 and back cover 13, the first portion of lateral pleat 33 is downwardly flipped onto panel 21 and the first portion of lateral flap 31 is downwardly flipped onto the first portion of pleat 33. Next, longitudinal leaf 25 is flipped onto section 21 (referring to FIG. 6), and the second portion of lateral pleat 33 is flipped onto the folded portions of longitudinal leaves 25, 27, straddling fold line 43. The second portion of lateral flap 31 is folded onto the second portion of pleat 33. Next longitudinal leaf 27 is flipped to the left onto leaf 25, and the procedure is repeated by downwardly flipping the third portion of pleat 33 onto the sections straddling fold line 45 and by downwardly flipping the third portion of flap 31 onto the third portion of pleat 33. Finally, leaft 29 is flipped to the left (referring to FIG. 6), onto leaf 27, the fourth portion of pleat 33 is flipped downwardly onto the sections straddling fold line 47, and the fourth portion of flap 31 is flipped downwardly onto the fourth portion of pleat 33.

The map is then in book form as shown in FIG. 4. The centerfold can be readily pulled outwardly, as illustrated in FIG. 8, in order to view a larger area if two hands are available. If a smaller area (four sections, each having the size of front cover 11) is sufficient, the map can be treated as a thin paperback book and handled with one hand.

More specifically, when the map is in book form, as seen in FIG. 1, and the first portion of flap 31 and the first portion of pleat 33 are folded upwardly, as shown in the left side of FIG. 12, for example, the user has four sections in view. If the user is traveling in a west-east direction, as on U.S. Highway 460, in West Virginia, for example, he can flip the second portions of flap 31 and pleat 33 upwardly after turning leaf 25 (preferably after also having flipped the first portions of flap 31 and pleat 33 downwardly) and again have four such sections exposed to view. If he is continuing on U.S. 460 in an easterly direction, he can again similarly return flap 31 and pleat 33 to their downward position and then flip longitudinal leaf 27 to the left (referring to FIG. 6), and thereafter flip the third portion of lateral flap 31 and lateral pleat 33 upwardly to view a third set of four such sections. Finally, having arrived in the State of Virginia, he can return flap 31 and pleat 33 to their downward positions and flip longitudinal leaf 29 to the left and then flip the fourth portion of strip 31 and lateral pleat 33 upwardly to read background information, such as a mileage diagram or a legend indicating the significance of colors, route markers, and miscellaneous symbols on the panels straddling fold line 47.

If, however, the user prefers to view a larger portion of the map at one time, he can grasp longitudinal leaf 27, preferably at about lateral strip 35, pull it outwardly as indicated in FIG. 8, and lay the centerfold formed thereby to the right as indicated in FIGS. 9, 10, and 12, or to the left as indicated in FIGS. 11 and 13. The user is thereby enabled to view eight sections corresponding in size to sections 21, 23 with each leftward or rightward flip of the centerfold if the respective portions of lateral pleat 33 are flipped downwardly and can see another set of eight different sections if the respective portions of lateral pleat 33 are flipped upwardly.

Each group of four sections can be identified and is preferably identified by an over-printed page number 71 in the lower right corner thereof. Furthermore, each individual section can be identified and is preferably so identified by an over printed letter 73 in a non-interfering color, such as brown or yellow.

Thus the method of this invention for locating features on the permanently folded map in book form comprises a directory and a coding system.

The directory 77 is imprinted on the reverse sides of the lateral flaps which are viewable when lateral flaps 31 are flipped downwardly onto lateral pleats 33. The directory comprises a column of cities or other selected features in alphabetical order, a page column, a section column, and a color column. Four such four-column groups are exposed to view when any two adjacent leaves are laid flat.

The coding system comprises numbers 71 on each of the eight pages that are formed by the bottom strip and the lower side of the lateral pleat, in combination, and by the upper side of the lateral pleat, the lateral strip, and the lateral flap, in combination, when any two adjoining leaves are laid flat. Each of these eight pages is viewable without extending the centerfold, so that the map is viewable in any of eight parts. Each page bears an identifying number 71, from one through eight, in a characteristic color, such as green. Each page has approximately the same width as the front cover or the back cover and a height that equals $(a+c)-b$ or $(c+b+d)$.

The page numbers read like a book except that pages 1 and 2 move together on one turn as do pages 3 and 4, 5 and 6, and 7 and 8. Odd numbered pages are revealed by upwardly flipping lateral flaps 31. Even numbered pages are viewed by upwardly flipping lateral pleats 33.

An outline of the state is overprinted on the directory and on the reverse side of each portion of the lateral flap, preferably in the same characteristic color as the page numbers, such as green, and contains lines therewithin that show the areas covered by the two pages which are: (a) on the front side of the same portion of the lateral flap, on the corresponding portion of the lateral strip, and on the upper side of the corresponding portion of the lateral pleat, and (b) on the lower side of the corresponding portion of the lateral pleat and on the corresponding portion of the bottom strip.

The coding system further comprises sub-divisions of each page of the mounted map into four quadrants, termed sections, and imprinting each section with a distinguishing symbol, such as a letter 73, that is large enough and vividly colored enough to be strikingly visible (e.g., having 30–45% of the height of the section) while not obscuring the features of the map. The symbol is imprinted in the center of each section and is preferably bright yellow or brown. Four such symbols are used on each numbered four-section page, as seen in FIG. 10.

Each section is then subdivided into four subsections 79 which are imprinted with one of four pastel colors. The colored sections always have the same relationship to each other; i.e., if the colors, read clockwise, as seen in FIG. 10, are red, green, blue, and yellow, for example, the red color is always in the upper right section. Thin white lines outline all subsections. They are formed by an absence of the pastel colors.

Consequently, the viewer can see at a glance which portion of the state is encompassed by the respective two ages that are opened to view beneath the top lateral flap and the lateral pleat as they are flipped upwardly. For example, if the viewer is looking for Moundsville, W.V., and knows that it is in the northernmost and central part of the state, and if he happens to open the map where pages 5 and 6 are exposed, the quickest possible glance at the outline showing the numbers 5 and 6 to the east of the central part shows him that he is too far to the east. Thus by flipping one leaf over, he can see that pages 3 and 4 are in the center of the state and that page 3 encompasses the northernmost part of the state. Then by flipping the top lateral flap upwardly, he sees all of page 3 and can perhaps spot the city of Moundsville immediately if he is sufficiently familiar therewith. If not, he can flip the lateral flap downwardly again and look for Moundsville in the alphabetically listed directory. There he will find that it is available on page 3, in section B, and within color "B" for blue. Now flipping the lateral flap upwardly again, he can find the section in the upper right portion of the page 3 that is marked with a birght yellow or bright brown "B" and the particular subsection, in the lower left portion of section B, that is colored blue and there can readily find the town of Moundsville near the bottom thereof.

Thus the user of the map can locate destinations that are very minor in character and can plan his route to reach each destination and can even manipulate the map with one hand while driving a car or piloting a boat or an airplane, for example. It is even possible to handle this map in a strong wind or during conditions of poor visibility or while the viewer is subejct to eratic motions, such as in an airplane being buffeted by turbulent weather or in a boat during a gale.

Depending upon whether the state or other area that is being depicted by the map is essentially square in shape or is uneven as to its principal dimensions, such as being rectangular, other useful information, such as city inserts 82, mileage diagrams 81, and legends 83, can be placed along the top or bottom of the map or along one side or in any corner that the profile of the state permits.

The cover insert 16 which is folded about the rear hinge is useful for keeping one's place at a specific page, for imprinting directions and other useful information such as the CB "10" Code, and for advertisements.

The method of this invention for locating a feature on a map is a method involving sequential focussing and concentrating of attention, by means of a series of indicators, upon sequentially smaller portions of the map. This method for locating a feature on a map is much faster for the user than the abscissa/ordinate intersecting method of the prior art. It is furthermore better suited to the mental processes of most individuals in that it utilizes color as a feature-locating tool. It preferably comprises a color-keyed map overprint/page number 71 as to the two overlying pages, a vividly colored overprinted symbol 73 as to the sections, and a color-identification 79 as to the quarter-sections, although all elements of this combination are not essential. Moreover, this three-stage sequence can be repeated one or more times to zero in on a very minor feature or to go from a very large area to a very small one. Lower-case letters of the Roman alphabet, capital or lower-case letters of the Greek alphabet, or the letters of other languages can alternatively be used for symbol overprinting to indicate the sections, and other numerical systems other than Arabic numerals, such as Roman numerals or Chinese numerals, can be used to indicate page numbers for such multi-stage sequences or even for the three-stage sequence described hereinbefore.

It is also feasible to break down a page into other than four quadrant sections—such as six sextant sections—and to subdivide each such sextant section into other than four colored subsections—such as using six colors in a revolving pattern to mark six subsections. Thus a page can be subdivided into 36 parts, for example, instead of into 16 parts, as shown in the drawings and as described hereinbefore. It is further possible, although it is not preferred, to reverse the indicators used hereinbefore for the pages, sections, and subsections. For example, the subsections can be indicated by overprinted symbols, and the sections can be indicated by a revolving color pattern.

An additional advantage of this sequential concentration method is that it is useful for any map of any size, folding pattern, or binding condition. In other words, it is as useful for the ordinary map in temporarily folded or rolled condition as for the permanantly folded map of this invention.

The sequential concentration system of this invention for locating a feature on a map therefore comprises: A. a coding system which comprises: (1) a pagination system, comprising: (a) pages containing large areas within which these features are located and (b) page indicators which correspond to the pages and are printed thereon, (2) a section system, comprising: (a) a plurality of sections into which the pages are subdivided, and (b) overprinted section indicators within the sections, and (3) a subsection system, comprising: (a) a plurality of subsections into which the sections are subdivided, and (b) overprinted subsection indicators within the subsections; and B. a directory which comprises: (1) a featrue column listing the features, (2) a page column listing the page indicators corresponding to the locations of the features within the pages, (3) a section column listing the section indicators corresponding to the locations of the features within the sections, and (4) a subsection column listing the subsection indicators corresponding to the locations of the features within the subsections. In this system, the page indicators are preferably Roman numerals, the section indicators are symbols in the form of capital Roman letters, and the subsection indicators are pastel colors, with all section indicators and subsection indicators being arranged in characteristic sequences.

This system further comprises overprint outlines 84 of the map which are disposed on the directory, each containing therewithin: A. lines illustrating at least one large area contained within at least one page; and B. a page indicator denoting each illustrated large area. An overprint outline is on the reverse of each portion of the lateral flap so that the relationship of every page to the overprint outline is illustrated. The overprint outline, the page indicator therewithin, and the page indicator as printed on the page are preferably in the same characteristic color.

Because it will be readily apparent to those skilled in the art that innumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

What is claimed is:

1. A permanently mounted map in book form which comprises:
   A. a unitary cover, having a longitudinal hinge between a front cover and a back cover, an upper edge, a lower edge, and a length therebetween; and
   B. said map in permanently folded form, having:
      (1) a bottom edge and a top edge,
      (2) at least four lateral folds, comprising:
         (a) an inwardly folded first lateral fold which is spaced from said bottom edge of said map by a distance that is less than said length of said cover to define a bottom strip extending across the entire width of said map,
         (b) an outwardly folded second lateral fold which is spaced from said first lateral fold by less than said distance,
         (c) an inwardly folded third lateral fold which is juxtaposed to said first lateral fold to form a lateral pleat, having said second lateral fold equidistant between said first and third lateral folds, that extends across the entire width of said map,
         (d) an inwardly folded final lateral fold which is spaced from said top edge of said map to form a lateral flap and which defines at least one lateral strip, between said third and final lateral folds, that extends across the entire width of said map, whereby at least three offset strips are available for indexing, and
      (3) at least seven longitudinal folds which are alternately folded inwardly and outwardly to form at least three double leaves and a pair of single leaves in flanking relationship to said double leaves,
      (4) slits, in alternate longitudinal folds, from said first lateral fold to said third lateral fold and from said final lateral fold to said top edge, whereby said lateral flap and said lateral pleat are slit along the outer edges of said double leaves, and
      (5) attachment of said lateral strip and said bottom strip within said single leaves to the inside of said front cover and to the inside of said back cover, while said first and third lateral folds are juxtaposed, so taht said final lateral fold is approximately adjacent to said upper edge of said cover.

2. The permanently mounted map in book form of claim 1 wherein said at least three double leaves are always an odd number of said double leaves.

3. The permanently mounted map in book form of claim 2 wherein both sides of the central double leaf of said odd number of double leaves are attached to each other to form a central conjoined leaf.

4. The permanently mounted map in book form of claim 3 wherein an outward pull on said central conjoined leaf creates an extended centerfold.

5. The permanently mounted map in book form of claim 4 wherein pivoting said centerfold to overlay said back cover and upwardly flipping said lateral flap exposes the upper left one fourth of said map.

6. The permanently mounted map in book form of claim 4 wherein pivoting said centerfold to overlay said back cover and upwardly flipping both said lateral flap and said lateral pleat exposes the lower left one fourth of said map.

7. The permanently mounted map in book form of claim 4 wherein pivoting said centerfold to overlay said front cover and upwardly flipping said lateral flap and said lateral pleat exposes the upper right one fourth of said map.

8. The permanently mounted map in book form of claim 4 wherein pivoting said centerfold to overlay said front cover and upwardly flipping both said lateral flap and said lateral pleat exposes the lower right one fourth of said map.

9. The permanently mounted map in book form of claim 4 wherein said map consists of three said double leaves, said pair of flanking single leaves, and eight pages.

10. The permanently mounted map in book form of claim 4 wherein said map consists of five said double leaves, said pair of flanking single leaves, and twelve pages.

11. The permanently mounted map in book form of claim 10 wherein pivoting said extended centerfold into essentially adjacent relationship with said cover and upwardly flipping said lateral flap exposes one fourth of said map to view, totalling three pages.

12. The permanently mounted map in book form of claim 10 wherein pivoting said extended centerfold into essentially adjacent relationship with said cover and upwardly flipping said lateral flap and said lateral pleat exposes one fourth of said map to view, totalling three pages.

13. The permanently mounted map in book form of claim 1 wherein said at least three double leaves are always a multiple of an odd number and wherein the inward longitudinal fold between each group of three said double leaves is held in close proximity to said hinge.

14. The permanently mounted map in book form of claim 13 wherein said odd number is three and said multiple is two.

15. The permanently mounted map in book form of claim 14 wherein both sides of the central double leaf of said at least three double leaves are attached to each other to form two central conjoined leaves.

16. The permanently mounted map in book form of claim 15 wherein outward pulls on said two central conjoined leaves creates two centerfolds in parallel.

17. The permanently mounted map in book form of claim 16 wherein pivoting said two centerfolds to overlay said back cover and upwardly flipping said lateral flap exposes the upper left 1/7 of said map, totalling two pages.

18. The permanently mounted map in book form of claim 16 wherein pivoting said two centerfolds to overlay said back cover and upwardly flipping both said lateral flap and said lateral pleat exposes the lower left 1/7 of said map, totalling two pages.

19. The permanently mounted map in book form of claim 16 wherein pivoting the righthand centerfold of said two centerfolds to overlay said back cover and upwardly flipping said lateral flaps exposes 3/14 of said map, totalling three pages.

20. The permanently mounted map in book form of claim 1 wherein an offset strip is viewable along the outwardly folded edge of each said pleat when said pleat is flipped downwardly, said offset strip being approximately equal in width to the width of said lateral strip.

21. A permanently folded map in book form, comprising:
A. a foldable cover;
B. a map having a bottom, a top, a left side, a right side, a front surface, and a back surface and having topographical features printed on said front surface, said map comprising:
(1) at least four parallel lateral folds which are numbered from said bottom, the first, third, and fourth said lateral folds being inward folds, the second said lateral fold being an outward fold, said third and first lateral folds being adjacently disposed to form a lateral pleat therebetween, said third and fourth lateral folds being sapced apart to form a lateral strip therebetween, said first lateral fold and said bottom being spaced apart to form a bottom strip, and the distance between said third fold and said second fold being equal to the distance between said second fold and said first fold, to define the width of said lateral pleat, but less than the distance between said first fold and said bottom by an offset difference,
(2) seven longitudinal folds which are numbered from said left side, the first, third, fifth, and seventh said longitudinal folds being inward folds and the second, fourth, and sixth said longitudinal folds being outward folds, and
(3) six longitudinal slits along said outward longitudinal folds, of which three extend from said top of said fourth lateral fold and three extend from said third lateral fold to said first lateral fold; and
C. an adhesively secured area over which said cover and said map are conjoined, comprising:
(1) section portions of said lateral strip between said left side and said first longitudinal fold and between seventh longitudinal fold and said right side,
(2) section portions of said bottom strip between said left side and said first longitudinal fold and between said seventh longitudinal fold and said right side.

22. The map in book form of claim 21 wherein said cover comprises a front cover and a book cover which are foldably connected by means of a front hinge.

23. The map in book form of claim 22 wherein said section portions, in combination, have approximately the same length and width as said front cover and said back cover.

24. The map in book form of claim 23 wherein said cover comprises a cover flap which is foldably connected to said book cover with a back hinge.

25. The map in book form of claim 23 wherein said offset distance is approximately equal to the width of said lateral strip.

26. The map in book form of claim 25 wherein said distance between said top and said fourth lateral fold is equal to said width of said lateral pleat.

27. The map in book form of claim 25 wherein said fourth lateral fold is adjacently disposed to a sixth lateral fold which is an inward fold and wherein a fifth lateral fold is an outward fold which is equidistant between said fourth lateral fold and said sixth lateral fold to form a second lateral pleat.

28. The map in book form of claim 27 wherein said second lateral pleat has the same width as said first lateral pleat.

29. The map in book form of claim 28 wherein said fifth fold of said second lateral pleat is spaced from said second fold, when both said lateral pleats are disposed on top of said bottom strip, by a second offset distance having the width of said lateral strip.

30. The map in book form of claim 29 wherein a seventh lateral fold is spaced from said sixth lateral fold by a distance defining the width of a second lateral strip.

31. The map in book form of claim 30 wherein said seventh lateral fold is an inward fold and wherein the area between said top and said seventh lateral fold is said top flap.

32. The map in book form of claim 31 wherein said top is spaced from said sixth lateral fold, when said second lateral pleat is disposed on top of said first lateral pleat, by a third offset distance equalling the width of said second lateral strip.

33. A permanently mounted map in book form which comprises:
A. a unitary cover, having a front cover portion, a back cover portion, a longitudinal hinge therebetween, an upper edge, a lower edge, and a cover length therebetween; and
B. a sheetlike map, comprising:
(1) a left side, a right side, a map width therebetween that is substantially greater than the width of said unitary cover, a bottom edge, a top edge, and a map length therebetween,
(2) a lower left corner portion, having a length that is less than said cover length, which is attached to the inside surface of said front cover portion,
(3) a lower right corner portion, having a length equal to said length of said lower left corner portion, which is attached to the inside surface of said back cover portion,
(4) a bottom strip which has said map width and includes said left and right corner portions, (5) a lateral strip which:
  (a) has said map width,
  (b) is longitudinally spaced from said bottom strip, and
  (c) is attached to said inside surfaces of said cover portions, adjacent to said corner portions,
(6) a lateral pleat, having said map width and disposed between said bottom strip and said lateral strip, which is laterally folded and has a folded length that is less than said length of said corner portions, whereby a first offset strip is exposed adjacent to said bottom edge when said lateral pleat is laid upon said bottom strip,
(7) a lateral flap which:
  (a) is adjacent to said lateral strip,
  (b) extends beyond said upper edge, and
  (c) has a length less than the combined lengths of said lateral pleat and said lateral strip, whereby a second offset strip is exposed when said lateral flap is laid upon said lateral pleat,
(8) at least seven longitudinal folds which are alternately folded inwardly and outwardly to form at least three double leaves and a pair of single leaves in flanking relationship to said double leaves, the first and last of said longitudinal folds coinciding with said longitudinal hinge, and
(9) slits through said lateral flap and said lateral pleat along the outer edges of said double leaves whereby an extended centerfold is created by outwardly pulling the central double leaf of said at least three double leaves and whereby both halves of said sheetlike map are alternately viewable by laying said extended centerfold upon said front cover portion or upon said back cover portion.

* * * * *